(12) United States Patent
Nishidate et al.

(10) Patent No.: US 7,464,388 B2
(45) Date of Patent: Dec. 9, 2008

(54) OPTICAL PICKUP

(75) Inventors: Tetsuo Nishidate, Osaka (JP); Takayuki Murakami, Osaka (JP)

(73) Assignee: Funai Electric Co., Ltd. (JP)

( * ) Notice: Subject to any disclaimer, the term of this patent is extended or adjusted under 35 U.S.C. 154(b) by 364 days.

(21) Appl. No.: 11/335,667

(22) Filed: Jan. 20, 2006

(65) Prior Publication Data

US 2006/0187801 A1    Aug. 24, 2006

(30) Foreign Application Priority Data

Jan. 25, 2005   (JP) .............................. 2005-017523

(51) Int. Cl.
*G11B 7/00* (2006.01)

(52) U.S. Cl. ..................... 720/676; 369/125

(58) Field of Classification Search ................. 720/676; 369/125

See application file for complete search history.

(56) References Cited

U.S. PATENT DOCUMENTS

| | | | |
|---|---|---|---|
| 7,191,457 B2 * | 3/2007 | Saito et al. | 720/678 |
| 2005/0005282 A1 * | 1/2005 | Chen | 720/672 |
| 2005/0076351 A1 * | 4/2005 | Tang et al. | 720/649 |
| 2005/0086677 A1 * | 4/2005 | Ochi et al. | 720/659 |
| 2005/0210485 A1 * | 9/2005 | Ueda et al. | 720/649 |
| 2006/0117332 A1 * | 6/2006 | Ochi et al. | 720/659 |

FOREIGN PATENT DOCUMENTS

| | | |
|---|---|---|
| JP | 07-085493 | 3/1995 |
| JP | 11-154334 | 6/1999 |
| JP | 2000-067457 | 3/2000 |
| JP | 2001-307371 | 11/2001 |
| JP | 2004-145921 | 5/2004 |

* cited by examiner

*Primary Examiner*—Angel A. Castro
(74) *Attorney, Agent, or Firm*—Bacon & Thomas, PLLC

(57) ABSTRACT

An optical pickup with improved vibration resistance and heat dissipation is mounted astride a main shaft 101 and a secondary shaft 102. The travel of the optical pickup is adapted to be guided by the main shaft, where a secondary bearing part 3 adapted to slide relative to the secondary shaft 102 includes an overlapping sliding face 32 and an auxiliary overlapping face 36, and a clearance δ is formed between the auxiliary overlapping face 36 and the secondary shaft 102 to improve ease of assembly. A control element 41 is mounted on a printed circuit board 4 mounted on a base member 1, and the control element is overlapped with a radiator plate 5. The radiator plate 5 is provided with a pressing piece 54, and the pressing piece 54 is brought into elastic contact with the secondary shaft 102 to reliably bring the overlapping sliding face 32 into elastic contact with the secondary shaft 102.

4 Claims, 4 Drawing Sheets

OPTICAL PICKUP

BACKGROUND OF THE INVENTION

1. Field of the Invention

The present invention relates to an optical pickup, and more particularly to an optical pickup in which a control element as a heating part and a radiator plate are mounted on a base member with the travel thereof being adapted to be guided by a main shaft and a secondary shaft.

2. Description of the Prior Art

There have conventionally been proposed various kinds of optical pickups for making recording onto and/or reproduction from a disk as a recording medium (refer to Japanese Patent Laid-Open Publication Nos. 2000-67457 and 2001-307371 for example).

Japanese Patent Laid-Open Publication No. 2000-67457 includes descriptions of, for example, techniques for: passing guide shafts through a guide hole and a U-shaped guide portion provided, respectively, in two parts on the left and the right of a frame so that the frame can be moved in the radial direction of an optical recording disk; mounting a light source unit with a laser diode, a light detecting element, and a hologram element packed therein by resin molding on the frame; and exposing a grounding wire through a window of the light source unit and bringing a radiator plate into contact with the grounding wire as a measure for improving the radiation performance of the light source unit.

Also, Japanese Patent Laid-Open Publication No. 2001-307371 includes descriptions of, for example, techniques for: protecting a mirror and a prism attached to a resin frame of an optical pickup device using a metal radiator plate attached to the rear surface of the resin frame; and urging a laser diode and a light receiving element toward the resin frame using an elastic endplate portion formed in the radiator plate so that the laser diode and the light receiving element can be positioned and that the heat thereof can be released outward.

Meanwhile, FIG. 4 is a perspective view of a base member 1 of an optical pickup as a comparative example. The base member 1 is a die-cast product and is arranged in such a manner that the optical axis of an optical system to be formed between a laser diode (as a light source not shown in the figure) and the recording surface of a disk runs through approximately the central part thereof. Then, the base member 1 is provided with a sliding bearing 2 adapted to be guided by a metal main shaft 101 that is attached to a traverse chassis (not shown in the figure) on one side of an optical axis, passing point "a", and with a secondary bearing part 3 supported slidably by a secondary shaft 102 that is attached to the traverse chassis on the other side of the optical axis, passing point "a". In respect to the sliding bearing 2 and the secondary bearing part 3, the sliding bearing 2 is fitted slidably to the main shaft 101 with almost no backlash, whereby the main shaft 101 with the sliding bearing 2 fitted thereto exerts a substantial guiding effect when the optical pickup travels in the radial direction of a disk. On the other hand, the secondary bearing part 3 comprises a main support piece 31 and an auxiliary support piece 35 positioned, respectively, over and under the secondary shaft 102 in a sandwich manner. Then, the main support piece 31 is disposed slidably over the secondary shaft 102 in an overlapping manner, which can prevent the occurrence of the base member 1 rotating downward around the main shaft 101 due to its own weight, etc., while the auxiliary support piece 35 is disposed slidably under the secondary shaft 102 in an overlapping manner, which can prevent the occurrence of the base member 1 rotating upward around the main shaft 101 for some reasons. Therefore, the secondary bearing part 3 is uplifted from the secondary shaft 102. For this reason, since the guiding effect of the secondary bearing part 3, when the optical pickup travels, is adapted only to assist the guiding effect of the main shaft 101, it is not necessary that the secondary bearing part 3 be fitted with no backlash to the secondary shaft 102. Hence, in the base member 1 shown in FIG. 4, the spacing between the main support piece 31 and the auxiliary support piece 35 is predefined so that a clearance δ (refer to FIG. 3) is ensured between the secondary shaft 102 and the auxiliary support piece 35 when the main support piece 31 is in contact with the upper end of the secondary shaft 102, whereby the ease of assembly is improved and the sliding resistance against the secondary shaft 102 in a sliding operation is reduced to improve the traveling stability of the base member 1. It is noted that the traverse chassis is equipped with a turntable for rotating a disk placed thereon.

In addition, a printed circuit board 4 is mounted on the base member 1. The printed circuit board 4 includes a control element (IC) 41 for controlling the emission of a laser diode (as a light source) mounted thereon. The control element 41 is accompanied by elevated temperatures through its operation, and it is necessary to take a measure for suppressing the elevated operating temperatures to improve the performance. Generally, it is thus often the case that a radiator plate (not shown in FIG. 4) is mounted on the printed circuit board 4 to take a measure for suppressing the elevated operating temperatures in the control element 41 utilizing the radiation effect of the radiator plate.

In the case of ensuring such a clearance δ between the secondary bearing part 3 and the secondary shaft 102 for the purpose of improving the ease of assembly, etc. as in the comparative example described with reference to FIG. 4, when the optical pickup is vibrated due to external vibration, the existence of the clearance δ may impair the positional relationship between the optical pickup and a disk that is placed and rotated on the turntable, resulting in a possibility of exerting a negative impact on the performance in writing and reading with respect to the disk.

In this regard, in order to suppress the vibration of the optical pickup, it has been known that it is effective to position the main support piece 31 of the secondary bearing part 3 in elastic contact with the secondary shaft 102 utilizing a spring force. Taking such a measure allows the integrity (vibration resistance) of the optical pickup with the traverse chassis equipped with the turntable to be improved, reducing the possibility of exerting a negative impact on the performance in writing and reading with respect to a disk.

However, in the optical pickup according to the comparative example described with reference to FIG. 4, incorporating a radiator plate for suppressing the elevated operating temperatures in the control element 41 as well as a spring member adapted to give a spring force to position the main support piece 31 of the secondary bearing part 3 in elastic contact with the secondary shaft 102 leads to an increase in the number of parts. The increase in parts results in a reduction in ease of assembly and thereby decreases mass productivity. In addition, under the effect of weight increase due to the increase in the number of parts, the servo performance (e.g. traveling stability) of the optical pickup may possibly be reduced.

In this regard, the above discussed patent documents describe only measures dealing with radiation performance with no description about vibration resistance. Therefore, even if the techniques described in the patent documents may be used, it is impossible to improve the vibration resistance without causing a reduction in ease of assembly and thereby decreasing mass productivity or degrading the servo performance of the optical pickup.

SUMMARY OF THE INVENTION

The present invention has been made in view of the above-described circumstances, and an object thereof is to provide an optical pickup with improved vibration resistance without causing a reduction in ease of assembly and thereby a decrease mass productivity or degrading the servo performance of the optical pickup.

The present invention is directed to an optical pickup comprising a base member mounted astride a main shaft and a secondary shaft with the travel thereof adapted to be guided by the main shaft on which a printed circuit board with a control element (operating at elevated temperatures) mounted thereon and a radiator plate for suppressing elevated operating temperatures in the control element are mounted, in which a secondary bearing part adapted to slide relative to the secondary shaft comprises an overlapping sliding face slidably overlapping the secondary shaft and an auxiliary overlapping face forming a clearance with the secondary shaft on the opposite side of the overlapping sliding face with respect to the secondary shaft, wherein the radiator plate is provided integrally with a pressing piece formed in a bent manner, the pressing piece being adapted to be in elastic contact with the secondary shaft to bring the overlapping sliding face of the secondary bearing part into elastic contact with the secondary shaft.

In accordance with the above arrangement, it is possible not only to suppress elevated operating temperatures in the control element by the radiator plate, but also to bring the overlapping sliding face of the secondary bearing part into elastic contact with the secondary shaft by the operation of the pressing piece, without separately providing a spring member adapted to give a spring force, and therefore to improve the integrity of the optical pickup with a traverse chassis equipped with a turntable, resulting in an improvement in vibration resistance. It is therefore possible to improve the performance in writing and reading with respect to a disk without causing a reduction in mass productivity due to an increase in the number of parts.

In the present invention, it is preferable to employ an arrangement that the control element is positioned in the vicinity of the secondary shaft, and that the pressing piece is arranged laterally adjacent to the secondary bearing part to be in elastic contact with the secondary shaft. In accordance with this arrangement, it is possible to reliably exert the effect of the pressing piece of bringing the overlapping sliding face of the secondary bearing part into elastic contact with the secondary shaft, and therefore not only to prominently exert an effect of improving the integrity of the optical pickup with the traverse chassis, but also, with the additional arrangement that the control element is positioned in the vicinity of the secondary shaft, to release the heat of the radiator plate toward the secondary shaft through the pressing piece to reliably suppress temperature increase in the radiator plate even if the size of the radiator plate may be reduced. It is therefore possible to suppress a size increase and weight increase of the optical pickup, which makes it possible to improve the vibration resistance without causing a reduction in the servo performance thereof.

In the present invention, it is possible to employ an arrangement that the pressing piece comprises a plate-like suspended piece portion formed at the end edge on the side of the secondary shaft in the radiator plate in a bent manner to extend along the inside of the secondary shaft and a main piece portion formed at the end edge of the suspended piece portion in a bent manner to be in elastic contact with the secondary shaft, the suspended piece portion being provided with a cable holding function for holding a cable extending out of the printed circuit board to prevent the cable from coming into contact with the secondary shaft. In accordance with this arrangement, it is possible to avoid disadvantages due to a contact of the cable with the secondary shaft during the travel of the optical pickup such as an electrical short circuit due to separation of cable coatings and a reduction in the servo performance due to an additional contact resistance.

In the present invention, it is preferable to employ an arrangement that the radiator plate is further provided integrally and consecutively with a contact piece adapted to overlap the secondary bearing part. In accordance with this arrangement, it is possible to release the heat of the control element toward the metal base member through the contact piece of the radiator plate, and therefore to reliably suppress temperature increase in the control element even if the size of the radiator plate may be reduced. It is therefore possible to suppress a size increase and weight increase of the optical pickup, which makes it possible to improve the vibration resistance without causing a reduction in the servo performance thereof.

In another example, the present invention employs an optical pickup comprising a base member mounted astride a main shaft and a secondary shaft with the travel thereof being adapted to be guided by the main shaft on which a printed circuit board with a control element (operating at elevated temperatures) mounted thereon and a radiator plate for suppressing elevated operating temperatures in the control element are mounted, in which a secondary bearing part adapted to slide relative to the secondary shaft comprises an overlapping sliding face slidably overlapping the secondary shaft and an auxiliary overlapping face forming a clearance with the secondary shaft on the opposite side of the overlapping sliding face with respect to the secondary shaft, wherein the radiator plate has: an overlapping portion overlapping the control element that is positioned in the vicinity of the secondary shaft; a contact piece overlapping the secondary bearing part that is made of metal; and a pressing piece comprising a plate-like suspended piece portion formed at the end edge on the side of the secondary shaft in a bent manner to extend along the inside of the secondary shaft and a main piece portion formed at the end edge of the suspended piece portion in a bent manner to be in elastic contact with the secondary shaft to bring the overlapping sliding face of the secondary bearing part into elastic contact with the secondary shaft, the pressing piece being arranged laterally adjacent to the secondary bearing part, and a cable extended out of the printed circuit board being held by the suspended piece portion of the pressing piece to be kept away from the secondary shaft.

In accordance with the present invention, since the overlapping portion of the radiator plate overlaps the control element, the heat of the control element can be transferred efficiently to the radiator plate to efficiently suppress a temperature increase in the element. Other effects will be described with reference to an embodiment below.

In accordance with the present invention, in the optical pickup in which a clearance is formed between the secondary bearing part of the base member and the secondary shaft to improve ease of assembly and thereby mass productivity, the arrangement that the radiator plate is provided integrally with a pressing piece exhibits an effect that the vibration resistance and/or the servo performance thereof can be improved without adding a part. Accordingly, it is possible not only to improve the vibration resistance and/or the servo performance of a disk apparatus such as a CD or DVD that employs such an optical pickup as mentioned above and thereby the image quality thereof, but also to suppress a cost increase to provide such a disk apparatus at low cost.

DESCRIPTION OF THE PREFERRED EMBODIMENTS

Figure 1:
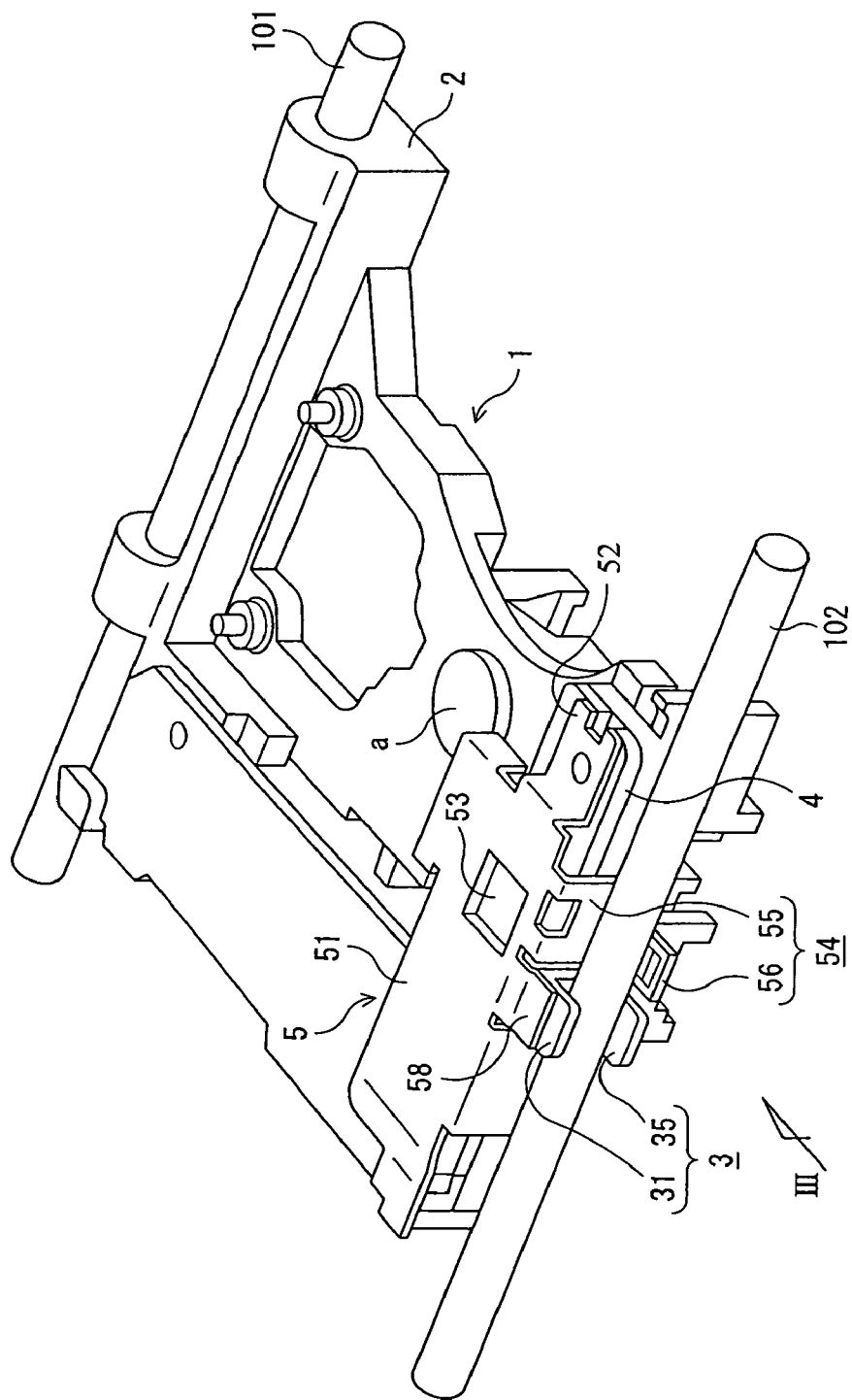
FIG. 1 is a schematic perspective view of a base member of an optical pickup according to an embodiment of the present invention.
Figure 2:
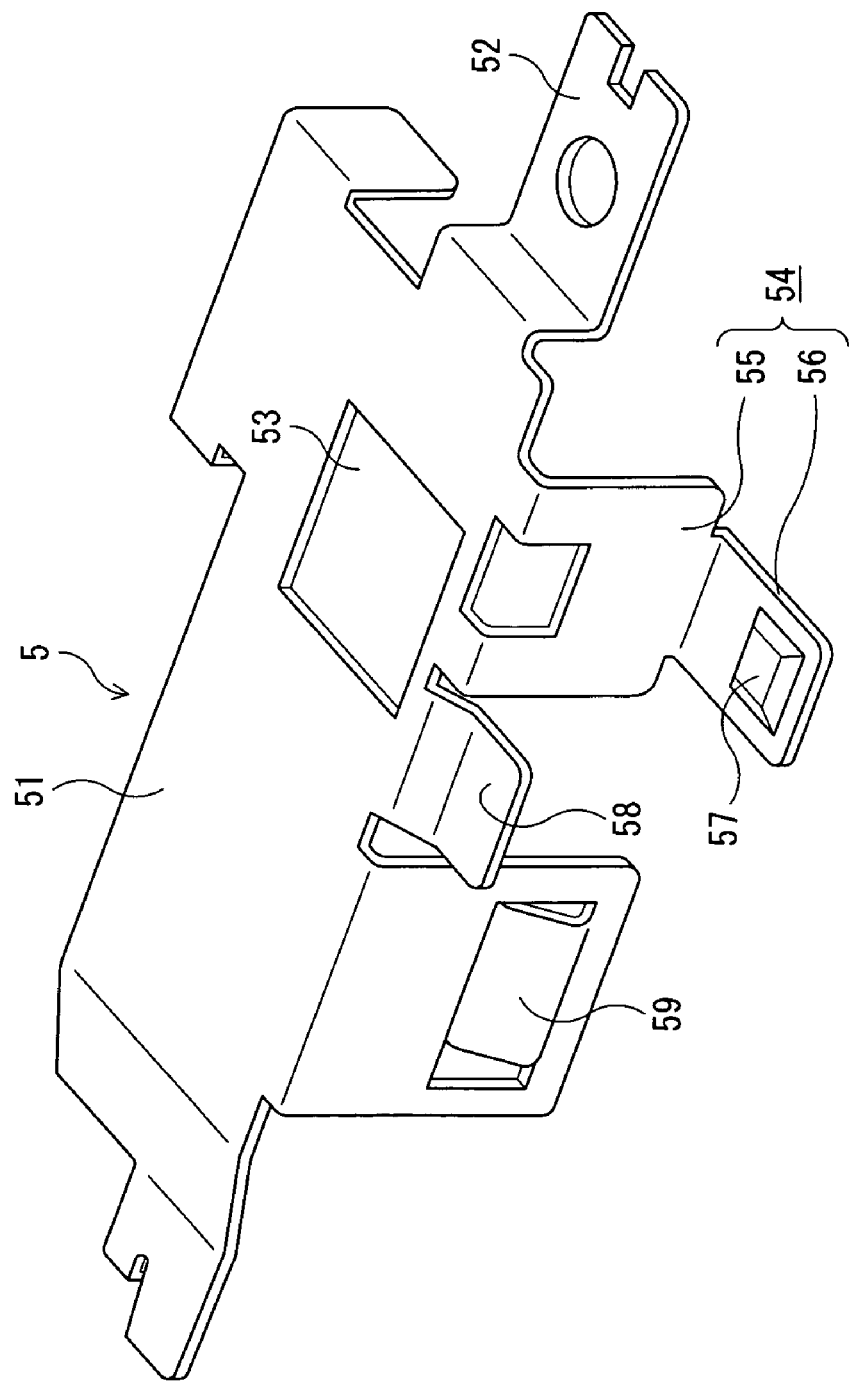
FIG. 2 is a perspective view of a radiator plate.
Figure 3:
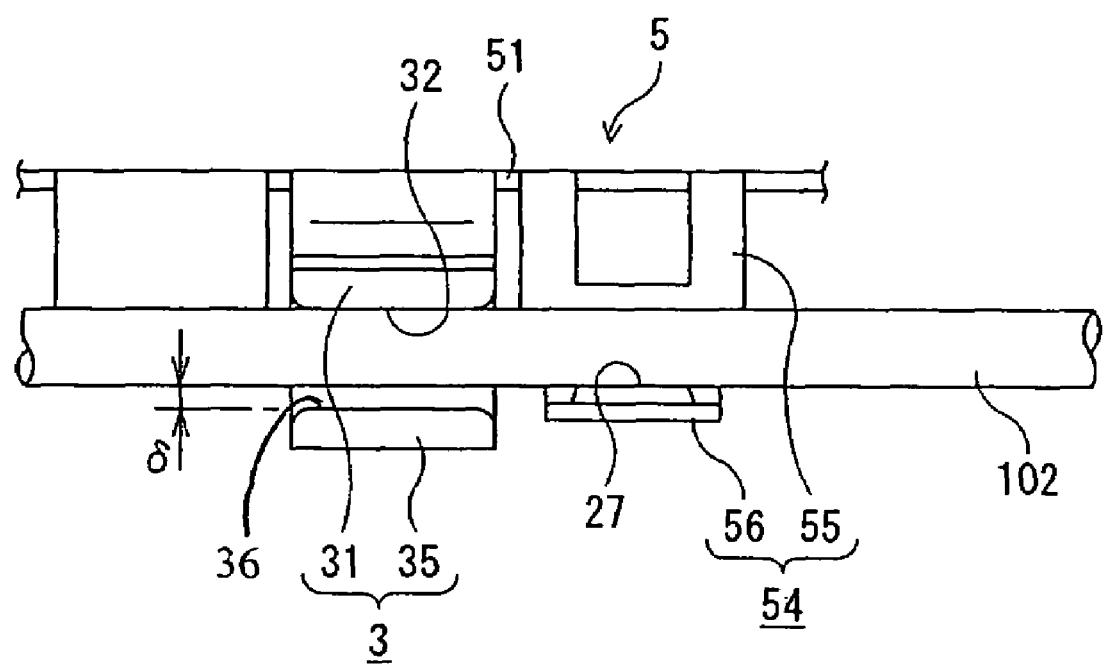
FIG. 3 is an enlarged side elevational view when viewed along the arrow III in FIG. 1.

FIG. 1 is a schematic perspective view of a base member 1 of an optical pickup according to an embodiment of the present invention; FIG. 2 is a perspective view of a radiator plate 5; and FIG. 3 is an enlarged side elevational view when viewed along the arrow III in FIG. 1.

The present embodiment corresponds to a case where a radiator plate 5 is added to the base member 1 as a comparative example having the arrangement described with reference to FIG. 4. Therefore, the base member 1 is a die-cast product. Also, there are provided a sliding bearing 2 adapted to be guided by a metal main shaft 101 that is attached to a traverse chassis (not shown in the figure) and a secondary bearing part 3 supported slidably by a secondary shaft 102 that is attached to the traverse chassis, respectively, on one side and the other side with respect to an optical axis, passing point "a", in approximately the central part of the member. Then, the sliding bearing 2 is fitted slidably to the main shaft 101 with almost no backlash, whereby the main shaft 101 exerts a substantial guiding effect when the optical pickup travels, while the secondary bearing part 3 is arranged in such a manner that a main support piece 31 is disposed slidably over the secondary shaft 102, that is made of metal, in an overlapping manner, and that a clearance δ (refer to FIG. 3) is ensured between an auxiliary overlapping face 36 formed as the upper surface of an auxiliary support piece 35 and the secondary shaft 102, whereby the ease of assembly is improved. Also, on the base member 1 is mounted a printed circuit board 4 with a control element (IC) 41 for controlling the emission of a laser diode as a light source mounted thereon.

Figure 4:
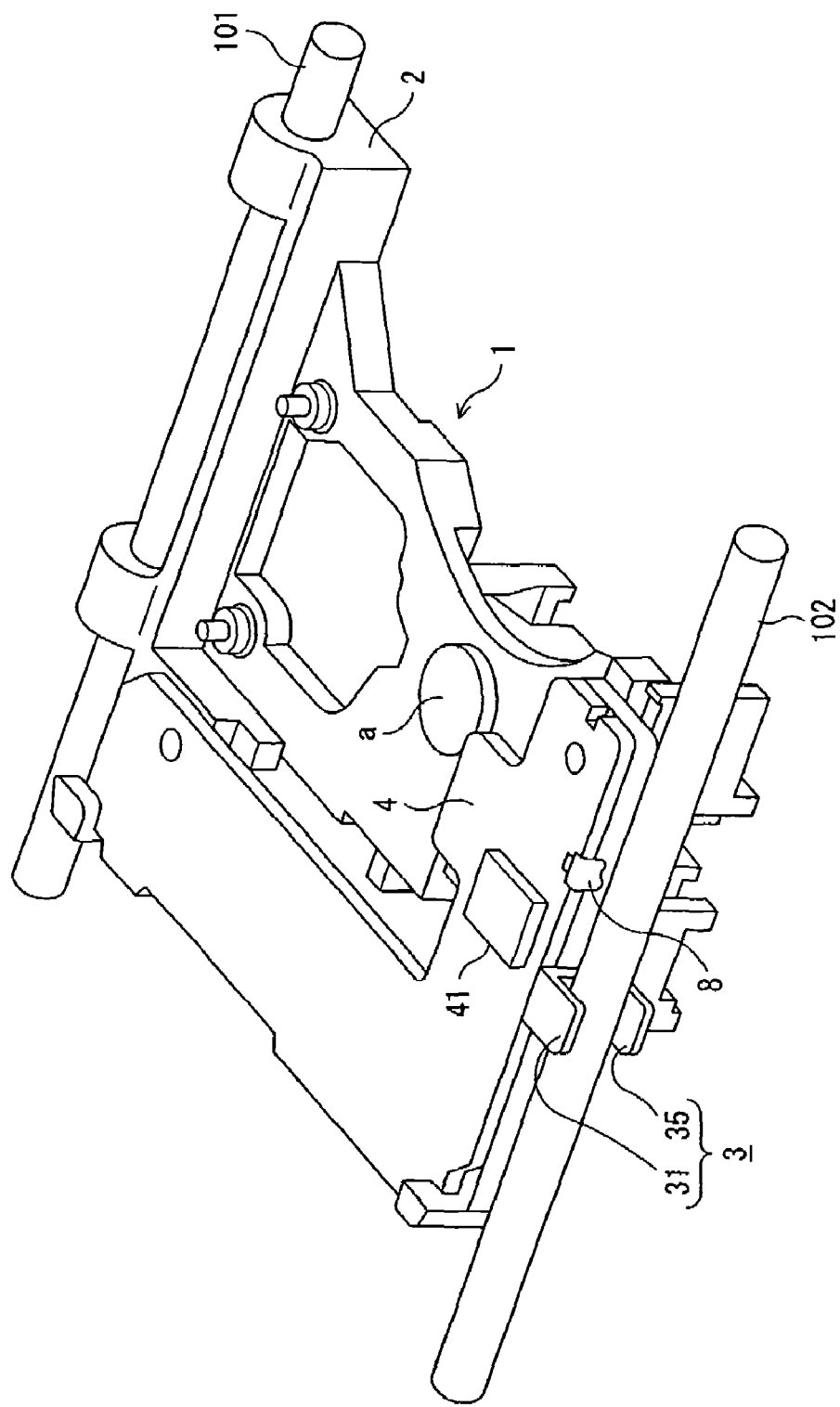
FIG. 4 is a perspective view of a base member of an optical pickup as a comparative example.

In addition, as shown in FIG. 4, the printed circuit board 4 mounted on the base member 1 is arranged along the end edge on the side of the secondary shaft 102 in the base member 1, whereby the control element 41 mounted on the printed circuit board 4 is positioned as close as possible to the secondary shaft 102. Further, as shown in FIG. 4, a cable 8 composed of a flexible printed circuit (FPC) board extends out of the end edge on the side of the secondary shaft 102 in the printed circuit board 4, and the cable 8 is connected to a light emitting element such as a laser diode or a light receiving element equipped under the base member 1 through the inside of the secondary shaft 102, though not shown in the figure.

The configuration of the radiator plate 5 and the structure for attachment to the base member 1 will be described with reference to FIGS. 1 to 4.

The radiator plate 5 comprises a flat main portion 51 having a large area and an attachment piece portion 52 provided consecutively to one end of the main portion 51, and an overlapping portion 53 is formed by drawing in the main portion 51. Then, the attachment piece portion 52 is fixed to the base member 1 using a screw through the printed circuit board 4 to be mounted on the base member 1 as shown in FIG. 1, so that the overlapping portion 53 overlaps the entire upper surface of the control element 41 shown in FIG. 4. Also, a pressing piece 54 is formed at the end edge on the side of the secondary shaft 102 in the main portion 51 (corresponding to the end edge on the side of the secondary shaft 102 in the radiator plate 5) in a bent manner. The pressing piece 54 comprises a plate-like suspended piece portion 55 formed at the end edge of the main portion 51 in a bent manner to extend downward along the inside of the secondary shaft 102 and a main piece portion 56 formed at the end edge of the suspended piece portion 55 in a bent manner, where a swollen portion 57 formed on the main piece portion 56 is brought into elastic contact with the secondary shaft 102 from the under side thereof to bring an overlapping sliding face 32 formed as the lower surface of the main support piece 31 of the secondary bearing part 3 into elastic contact with the secondary shaft 102 as shown in FIG. 3. Then, the suspended piece portion 55 of the pressing piece 54 holds the cable 8 (refer to FIG. 4) from the outside thereof to keep the cable 8 away from the secondary shaft 102 and thereby to prevent the cable 8 from coming into contact with the secondary shaft 102. In addition, the pressing piece 54 is arranged laterally adjacent to the secondary bearing part 3 of the base member 1 as shown in FIG. 1 or 3. Therefore, the elastic contact force of the main piece portion 56 against the secondary shaft 102 is transferred efficiently to the main support piece 31 of the secondary bearing part 3 so that the overlapping sliding face 32 of the main support piece 31 is reliably brought into elastic contact with the secondary shaft 102. Employing this arrangement improves the integrity between the traverse chassis with the secondary shaft 102 attached thereto and the base member 1, which helps to improve the vibration resistance against external vibration. Further, the main portion 51 of the radiator plate 5 is provided with a contact piece 58 extending from the end edge on the side of the secondary shaft 102 therein, the contact piece 58 being in contact with the upper surface of the main support piece 31 of the secondary bearing part 3 in an overlapping manner. It is noted that in FIG. 2, the numeral 59 indicates an engaging piece for engaging the radiator plate 5 with the base member 1.

In accordance with the thus arranged optical pickup, the heat of the control element 41 is to be transferred and released toward the main portion 51 through the overlapping portion 53 of the radiator plate 5, and the heat thus transferred to the main portion 51 is further transferred to the secondary shaft 102 through the pressing piece 54 and to the secondary bearing part 3 through the contact piece 58. Therefore, the radiation effect of releasing the heat of the control element 41, and thereby suppressing temperature increase in the element, is accomplished not only by the radiator plate 5, but also by the secondary shaft 102 and/or the base member 1, whereby the effect of suppressing a temperature increase in the control element 41 is to be exerted prominently. Consequently, without increasing the size of the radiator plate 5 unnecessarily, the temperature increase in the control element 41 can be suppressed efficiently to reliably prevent the element from operating erroneously.

What is claimed is:

1. An optical pickup comprising a base member mounted astride a main shaft and a secondary shaft with the travel thereof adapted to be guided by said main shaft;

a printed circuit board with a control element mounted on the base member;

a radiator plate mounted on said base member for suppressing elevated operating temperatures in said control element; and a secondary bearing part adapted to slide relative to said secondary shaft comprises an overlapping sliding face slidably overlapping said secondary shaft and an auxiliary overlapping face forming a clearance with said secondary shaft on the opposite side of said overlapping sliding face with respect to said secondary shaft; wherein said radiator plate has: an overlapping portion overlapping said control element that is positioned in the vicinity of said secondary shaft; a contact piece overlapping said secondary bearing part that is made of metal; and a pressing piece comprising a plate-like suspended piece portion formed at an end edge on a side facing said secondary shaft in a bent manner to extend along the inside of said secondary shaft, and a main piece portion formed at an end edge of said suspended piece portion in a bent manner to be in elastic contact with said secondary shaft to bring said overlapping sliding face of said secondary bearing part into elastic contact with said secondary shaft, said pressing piece arranged laterally adjacent to said secondary bearing part, and a cable extended out of said printed circuit board being held by said suspended piece portion of said pressing piece to be kept away from said secondary shaft.

2. An optical pickup comprising a base member mounted astride a main shaft and a secondary shaft with the travel thereof adapted to be guided by said main shaft;

a printed circuit board with a control element mounted on the base member;

a radiator plate mounted on said base member for suppressing elevated operating temperatures in said control element; and a secondary bearing part adapted to slide relative to said secondary shaft comprises an overlapping sliding face slidably overlapping said secondary shaft and an auxiliary overlapping face forming a clearance with said secondary shaft on the opposite side of said overlapping sliding face with respect to said secondary shaft, wherein said radiator plate is provided integrally with a pressing piece formed in a bent manner, said pressing piece adapted to be in elastic contact with said secondary shaft to bring said overlapping sliding face of said secondary bearing part into elastic contact with said secondary shaft;

wherein said radiator part includes a contact piece adapted to overlap an oppsed face of the overlapping sliding face of the secondary bearing part.

3. The optical pickup according to claim 2, wherein said control element is positioned in the vicinity of said secondary shaft, and wherein said pressing piece is arranged laterally adjacent to said secondary bearing part to be in elastic contact with said secondary shaft.

4. The optical pickup according to claim 3, wherein said pressing piece comprises a plate-like suspended piece portion formed at an end edge on a side facing said secondary shaft in a bent manner to extend along the inside of said secondary shaft and a main piece portion formed at an end edge of said suspended piece portion in a bent manner to be in elastic contact with said secondary shaft, said suspended piece portion being provided with a cable holding portion for holding a cable extended out of said printed circuit board to prevent said cable from coming into contact with said secondary shaft.

* * * * *